US012623934B1

(12) United States Patent
Aljuryyed et al.

(10) Patent No.: US 12,623,934 B1
(45) Date of Patent: May 12, 2026

(54) ELECTROCHEMCIAL TREATMENT OF SALINE WASTERWATER WITH CAPTURED CO₂ TO PRODUCE SALINE FREE WATER

(71) Applicant: SAUDI ARABIAN OIL COMPANY, Dhahran (SA)

(72) Inventors: Norah Waled Aljuryyed, Dhahran (SA); Abeer Ateeq Alarawi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 19/025,616

(22) Filed: Jan. 16, 2025

(51) Int. Cl.
 *C02F 1/46* (2023.01)
 *C02F 1/26* (2023.01)
 (Continued)

(52) U.S. Cl.
 CPC ............ *C02F 1/4695* (2013.01); *C02F 1/265* (2013.01); *C02F 1/46109* (2013.01);
 (Continued)

(58) Field of Classification Search
 None
 See application file for complete search history.

(56) References Cited

U.S. PATENT DOCUMENTS 11,040,898 B2    6/2021  Sant et al.
11,452,949 B2    9/2022  Saini
      (Continued)

FOREIGN PATENT DOCUMENTS

CN        114875423  A     8/2022
KR      20200036416  A     4/2020

OTHER PUBLICATIONS

Dara, Saad, et al. "Conversion of saline waste-water and gaseous carbon dioxide to (bi) carbonate salts, hydrochloric acid and desalinated water for on-site industrial utilization." Reaction Chemistry & Engineering 4.1 (2019): 141-150.
      (Continued)

*Primary Examiner* — Peter Keyworth
(74) *Attorney, Agent, or Firm* — Vorys, Sater, Seymour and Pease, LLP

(57) ABSTRACT

Methods of separating water, salt, CO₂, and crude oil from wastewater, the methods comprising: providing gas/oil separation system that produces a waste saline water stream and a CO₂ stream; providing an electrochemical cell having an anode, a cathode, and three electrodialytic compartments; feeding a fresh water stream to the anode to produce H⁺ and O₂; feeding the waste CO₂ stream and O₂ to the cathode to produce bicarbonate (HCO₃—) and hydroxide ions (OH⁻); feeding the waste saline water stream to a center electrodialytic compartment; wherein the sodium Na⁺ from the waste saline water stream reacts with the bicarbonate to form NaHCO₃ and the chloride (Cl⁻) from the waste saline water stream reacts with the H⁺ to produce hydrochloric acid; and producing salt and desalinated water.

14 Claims, 1 Drawing Sheet

(51) Int. Cl.

| | |
|---|---|
| *C02F 1/461* | (2023.01) |
| *C02F 1/469* | (2023.01) |
| *C02F 101/10* | (2006.01) |
| *C02F 101/32* | (2006.01) |

(52) U.S. Cl.
CPC ...... *C02F 2101/10* (2013.01); *C02F 2101/32* (2013.01); *C02F 2201/46115* (2013.01); *C02F 2201/4618* (2013.01)

(56) References Cited

U.S. PATENT DOCUMENTS

| | | | |
|---|---|---|---|
| 2004/0055955 A1* | 3/2004 | Davis ..................... | B01D 61/44 |
| | | | 210/257.2 |
| 2009/0173232 A1* | 7/2009 | Folkvang ................ | B04C 5/103 |
| | | | 96/182 |
| 2022/0306495 A1* | 9/2022 | Soliman .................. | C02F 1/445 |
| 2023/0057182 A1 | 2/2023 | Shields | |

OTHER PUBLICATIONS

Zibrida, John F., Amjad, Zahid, Zuhl, Robert W., and James Lewis. "Advances in Reverse Osmosis Application in Water Reuse." Paper presented at the Corrosion 2000, Orlando, Florida, Mar. 2000.

Soliman, Mohamed Ahmed, et al. "Innovative Integrated and Compact Gas Oil Separation Plant for Upstream Surface Facilities." Offshore Technology Conference. OTC, 2020.

Jawad Mustafa, Simultaneous treatment of reject brine and capture of carbon dioxide: A comprehensive review, Desalination, vol. 483, 2020.

Sunghyun Cho, et al., Novel process design of desalination wastewater recovery for CO2 and SOX utilization, Chemical Engineering Journal, vol. 433, Part 2, 2022.

Mohammad Mahbub Kabir, et al., Electrodialysis desalination, resource and energy recovery from water industries for a circular economy, Desalination, vol. 569, 2024.

* cited by examiner

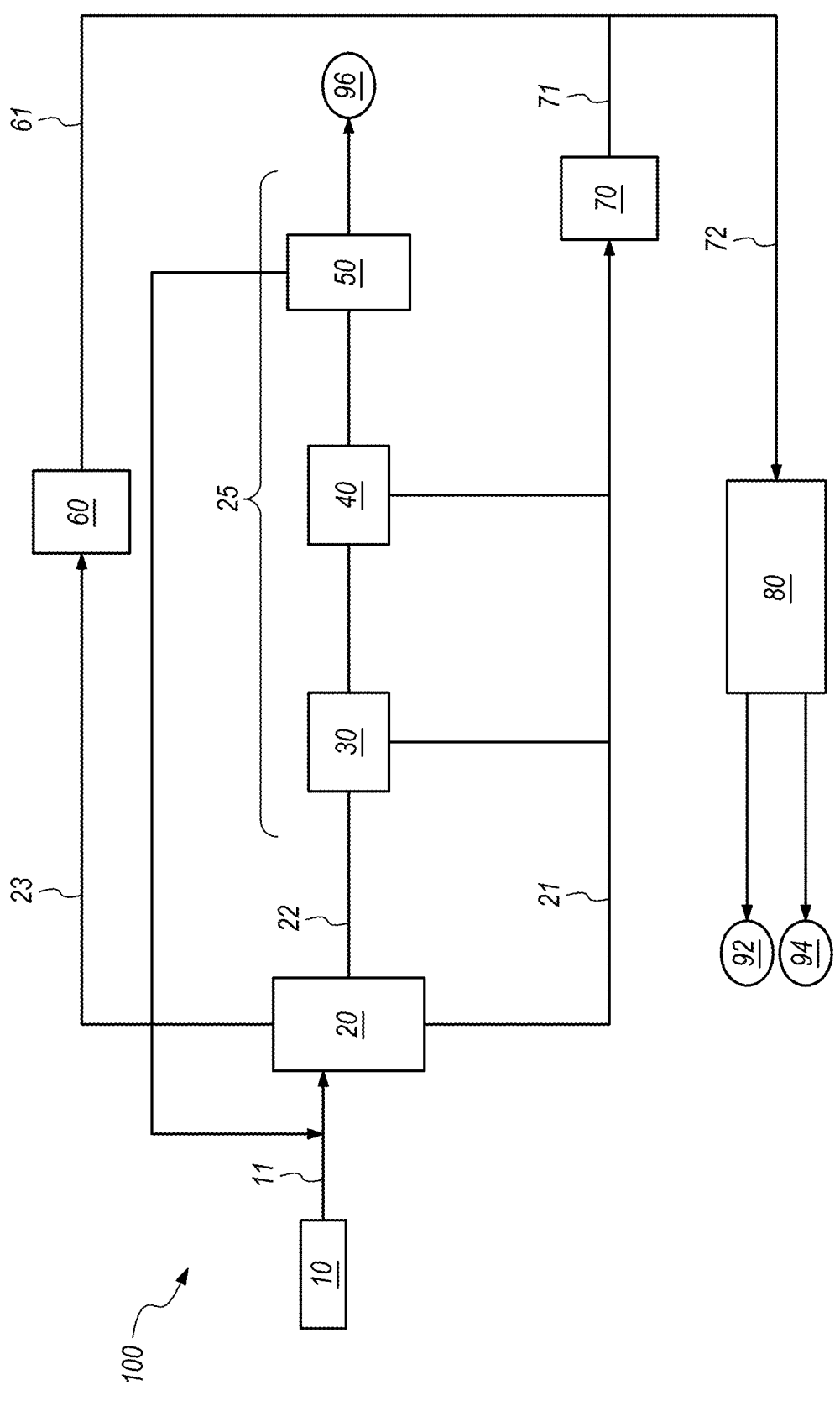

ELECTROCHEMCIAL TREATMENT OF SALINE WASTERWATER WITH CAPTURED CO$_2$ TO PRODUCE SALINE FREE WATER

FIELD OF THE DISCLOSURE

The present disclosure relates generally to methods to produce saline free water using a semi closed-loop system at a produced gas treatment facility, and, more particularly, to utilizing CO$_2$ streams and wastewater from the gas/chemical processing plant to produce saline free water.

BACKGROUND OF THE DISCLOSURE

Water has been an essential substance in daily life for the world's social growth in industrial agricultural application. Its supply should be sustainable and cost-effective to maintain the usable water in the world which is only 3% in comparison to the whole water resources worldwide. Thus, the treatment and utilization of the water were strongly required to the resolve such global crisis.

The global water shortage has resulted from population growth and industrialization and is a key challenge that humanity faces in the 21st century. Continuous progress on wastewater treatment technologies has been made to improve water reuse and reduce water shortages. Among them, the development of osmosis desalination, including the recovery of fresh water from an induction solution used for forward osmosis using power plant warm water and recycling of power plant exhaust gas.

In the gas-oil separation plant, the pressure is often reduced in several stages to allow the controlled separation of volatile components. The idea is to achieve maximum liquid recovery and stabilized oil and gas, and to separate water. A large pressure reduction in a single separator will cause flash vaporization, leading to instability and safety hazards.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to embodiments consistent with the present disclosure, methods of separating water, salt, CO$_2$, and crude oil from wastewater include providing gas/oil separation system that produces a waste saline water stream and a CO$_2$ stream. Providing an electrochemical cell having an anode, a cathode, and three electrodialytic compartments; feeding a fresh water stream to the anode to produce H$^+$ and O$_2$; feeding the waste CO$_2$ stream and O$_2$ to the cathode to produce bicarbonate (HCO$_3$$^-$) and hydroxide (OH$^-$); feeding the waste saline water stream to the center electrodialytic compartment; wherein the sodium (Na$^+$) from the waste saline water stream reacts with the bicarbonate to form NaHCO$_3$ and the chloride (Cl$^-$) from the waste saline water stream reacts with the H$^+$ to produce hydrochloric acid; and producing salt and desalinated water.

When an electrochemical cell is utilizing an anion exchange membrane to electrochemically separate carbon dioxide and oxygen from a feeding gaseous streams to the cell, the separation may occur according to the chemical reactions shown below:

$$OH^- + CO_2 \leftrightarrow HCO_3^-$$

$$OH^- + HCO_3 \text{---} \leftrightarrow CO_3^{2-} + H_2O$$

$$M^+ + HCO_3 \text{---} \leftrightarrow MHCO_3, (M^+ = Na^+)$$

$$2M^+ + CO_3^{2-} \leftrightarrow M_2CO_3 \ (M^+ = Na^+)$$

The anions in the cathode compartment then migrate through the cell and react with the protons formed in the oxidation process at the anode.

$$2H^+ + CO_3^{2-} \leftrightarrow H_2O + CO_2$$

$$H^+ + HCO_3^- \leftrightarrow H_2O + CO_2$$

$$H^+ + OH^- \leftrightarrow H_2O$$

Other embodiments include systems to separate water, salt, and CO$_2$ from wastewater. The system includes a wastewater feed comprising salt water and hydrocarbons, connected to a low pressure trap, wherein the low pressure trap separates the wastewater into three streams: a gas stream, a crude oil stream, and a salt water stream; and a water/CO$_2$ stream connected to an electrochemical cell; wherein: the gas steam is fed into a low pressure gas treatment system to produce a treated CO$_2$ stream; the salt water is fed into an oil/water separator to produce a saline water stream; and the water/CO$_2$ stream combines the treated CO$_2$ stream and the saline water steam, wherein the water/CO$_2$ stream is fed into the electrochemical cell to produce water free of saline and salt.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

The FIGURE is a schematic diagram of the system to separate water, salt, and CO$_2$ from wastewater.

DETAILED DESCRIPTION

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to methods of separating water, salt, CO$_2$, and crude oil from wastewater. The method includes feeding crude wastewater comprising salt water and hydrocarbons into a low-pressure production trap; separating the hydrocarbons and the salt water from the wastewater, wherein the hydrocarbon stream comprises crude oil and entrained $CO_2$. The $CO_2$ is transferred into a low-pressure gas treatment system to produce treated $CO_2$. The salt water is transferred to a water/oil separation chamber to produce waste saline water. The saline water and the treated $CO_2$ are fed into an electrochemical cell to produce salt and desalinated water.

In one or more embodiments, the methods may further include separating the crude oil to an oil refinery. The method may further include feeding the crude oil into an oil refinery. If the method includes the oil refinery, then it may produce salt water, which may be fed into the water/oil separator.

In some embodiments, the electrochemical cell comprises ion exchange membranes. When the salt water and treated $CO_2$ are fed into the electrochemical cell, the electrochemical cell produces water free of saline and dry salt. The dry salt may then be commercialized, and the water free of saline may be recycled. Within this disclosure "water free of saline" means that there is less than 100 ppm of salt dissolved in the water.

The salt concentration is measured via cell potential. The standard cell potential ($E°$ cell), defined as the potential of a cell measured under standard conditions that is, with all species in their standard states (1 M for solutions), at 1 atmosphere (pressure) and 298.15 Kelvin (temperature). Electrolysis of water without salt in a thin layer cell requires a voltage of more than 1.3 V. The voltage is found to be reduced to 0.4 V when hydrogen gas is dissolved in electrolyzed water. The decrease in the overvoltage can be used for the salt-free electrolysis of pure water.

Since there is no known way to measure the potential of a single electrode: only the difference between the potentials of two electrodes can be measured. (This is analogous to measuring absolute enthalpies or free energies. Recall that only differences in enthalpy and free energy can be measured.)

$$E°_{cell} = E°_{cathode} - E°_{anode}$$

It is a method for the conversion of gaseous carbon dioxide and saline waste-water to desalinated water and value-added products using a new electrodialysis approach which consists of a 5-compartment electrochemical cell, including an anode, cathode and three electrodialytic compartments. Water and gaseous $CO_2/O_2$ are electrochemically converted to oxygen/protons and bi(carbonate)/hydroxide at the anode and cathode, respectively.

The basic process uses a 5-compartment electrochemical cell including a titanium anode, a catalyzed (such as Pt/C) cathode, and three electrodialytic compartments. Water is converted to H+ and $O_2$ at the anode and gaseous $CO_2/O_2$ are electrochemically converted to produce bicarbonate ($CO_3$—) and hydroxide ($OH^-$) at the cathode. The three central electrodialysis compartments combine the ions present in the saline water, which is fed to the center electrodialytic compartment, with the products of the anode and cathode to produce chemicals and desalinated water. That is, within the cell, the sodium from the waste saline water reacts with the bicarbonate to produce $Na_2CO_3$ and chloride from the saline reacts with the H+ to produce hydrochloric acid (HCl). Thus, the process consumes waste $CO_2$ while removing the salts (NaCl) from the waste saline water.

In some embodiments, the wastewater is produced from a sweet well and does not comprise hydrogen disulfide.

As shown in the FIGURE, embodiments of the present disclosure include a system 100 to separate water, salt, and $CO_2$ from wet crude oil 10. The system 100 includes a wastewater feed 11 connected to a low pressure trap 20. The wastewater, in the wastewater feed 11, includes salt water and hydrocarbons. The low pressure trap 20 separates the wastewater feed 11 into three streams: a gas stream 23, a crude oil stream 22, and a salt water stream 21. The system 100 also includes a water/$CO_2$ stream 72 connected to an electrochemical cell 80. The gas steam 23 is fed into a low pressure gas treatment system 60 to produce a treated $CO_2$ stream 61. The salt water 21 is fed into an oil/water separator 70 to produce a saline water stream 71; and the water/$CO_2$ stream 72 combines the treated $CO_2$ stream 61 and the saline water steam 71. When the water/$CO_2$ stream 72 is fed into the electrochemical cell 80, water free of saline 92 and salt 94 are produced.

In some embodiments, the system further includes an oil refinery 25, in which crude oil stream 22 is fed into the oil refinery 25. In one or more embodiments, the oil refinery 25 includes one or more of a degassing tank 30, a dehydrator 40, and a crude stabilizer 50. When the oil refinery 25 includes the degassing tank 30, the degassing tank 30 connects to the wastewater stream 11 and the salt water stream 21, and feeds gas back into the wastewater stream 11 and feeds salt water into the salt water stream 21. When the oil refinery 25 includes the dehydrator 40, the dehydrator 40 is connected to the salt water stream 21 and feds salt water into the salt water stream 21. When the oil refinery 25 includes the crude stabilizer 50, the crude stabilizer 50 connects to the wastewater feed 11, and further streams $CO_2$ gas into the gas stream.

As depicted in the FIGURE, the wet crude oil 10 from oil production wells enters the low pressure trap 20 and undergoes an initial three-phase separation to remove most of the gas and water from the crude oil. The pressure decrease in the low pressure trap 20 causes the lighter hydrocarbon gases in the crude oil to separate from the heavier liquid hydrocarbons. The operating conditions in the low pressure trap 20 may range from 50° F. to 150° F., 60° F. to 140° F., 60° F. to 130° F., 50° F. to 130° F., or from 65° F. to 130° F. In some embodiments, the pressure in the low pressure trap 20 may be from about 10 psig to about 100, from about 10 psig to about 90, from about 25 psig to about 75, from about 30 psig to about 60, from about 40 psig to about 60, or approximately 50 psig.

Crude oil stream 22 from the low pressure trap 20 is passed to the degassing tank 30. Heating the crude oil makes it easier to separate out water when initial water cut is high and temperature is low. Typically heating of the crude oil is required to improve oil/water separation that occurs in the dehydrator 40, and to encourage degassing of the crudes in order to stabilize the crude oil in the crude oil stabilizer 50. The heated crude oil stream from the wet dry crude exchanger is passed to the degassing tank 30 which is three-phase separator operating at reduced pressure of 3.0 psig, so that the last heavy gas components can boil out. The operating conditions in the degassing tank 30 ranges 50° F. to 150° F., 60° F. to 140° F., 60° F. to 130° F., 50° F. to 130° F., or from 65° F. to 130° F. and about 3 to 5 psig.

The crude oil stream is passed from the degassing tank 30 into the dehydrator 40. The dehydrator 40 may be a horizontal vessel where the first stage of drying the wet crude oil takes place. The wet crude oil input to the dehydrator 40 may still contain salt water in the form of an emulsion. In some embodiments, the emulsion is separated into layers of oil and water by electrostatic coalescence in the dehydrator 40.

Electrostatic coalescence may use an electric current, causing the water droplets in the emulsion to collide, coalesce into larger (heavier) drops, and settle out of the crude oil. This process partially dries the wet crude oil and provides more water to the salt water stream 21. As previously indicated, there may be three sources that feeds into the salt water stream 21: the low pressure tank 20, the degassing tank 30, and the dehydrator 40. The salt water stream 21 goes to the water-oil separator 70, and saline water stream 71 is discharged for collection in water/oil separator 70. The operating temperature of the dehydrator ranges from 100° F. to 200° F., 100° F. to 200° F., 100° F. to 200° F., or 100° F. to 200° F. In one or more embodiments, the pressure to be may be from about 10 psig to about 100, from about 10 psig to about 90, from about 25 psig to about 75, from about 30 psig to about 60, from about 40 psig to about 60, or approximately 50 psig greater than the crude vapor pressure.

The vapor pressure of crude oil (VPCR) may range from less than 1 kPa to greater than atmospheric pressure (101.3 kPa or 1 atm). The VPCR is a major safety parameter for storage, transport, and handling of crudes.

Once crude oil is degassed, there are two more steps before the crude oil is suitable for storage, export and refining, which are sweetening and stabilization. Sweetening involves the removal of dissolved $H_2S$ from crude to meet specifications in range of 10-70 ppm $H_2S$ removal. The stabilizer 50, stabilizes the crude oil to produce refined crude oil 96, works on heating the unstabilized crude stream containing dissolved gaseous and $H_2S$, hence splitting it into two components: gas from the overhead and crude from the bottom.

Stabilizing the crude oil can be achieved if crude is heated in a multiple stages of separation drums working at increasing temperatures and reduced pressure. The stabilization unit does two jobs at the same time; sweetens sour crude oil by removing the hydrogen sulfide ($H_2S$) and reduces vapor pressure to meet the RVP, thereby making the crude safe for shipment in pipelines. It also aims at lowering vapor pressure of crude to less than 13 psia below atmospheric, i.e., no vapor will flash under atmospheric conditions, making it safe for transportation and shipment. The operating temperature of the crude stabilizer 50 ranges from 160° F. to 200° F. and the pressure ranges from 3 to 5 psig.

The electrochemical cell 80 converts carbon dioxide ($CO_2$) and saline waste-water to desalinated water and salt. The electrochemical cell 80 includes an anode, cathode and three electrodialytic compartments. Water and gaseous $CO_2$/$O_2$ may be electrochemically converted to oxygen/protons and bi(carbonate)/hydroxide at the anode and cathode, respectively. The three central electrodialysis compartments combine the ions present in the saline water with the products of the anode and cathode to produce value-added chemicals, such as salt, and desalinated water. The electrochemical cell may have an active area of 2.0 to 4.0 $cm^2$, in some embodiments 3.24 $cm^2$. The active area may contain two exchange membranes having anion and cation. Each exchange membrane may include Pt/C catalyzed cathode and titanium anode electrodes. The $CO_2$/saline water feed to the anode, cathode and central compartment may range at a flow rate of 2 milliliters per minute (mL/min) to 50 ml/min. The flow rate may be 5 mL/min. Without intent to be bound by theory, it is believed that by increasing the flow rates, particularly in the salt compartment and the anode chamber, a better overall performance was achieved. It is believed that there was an improved mass transfer (more turbulent) of salt ions and removal of generated oxygen gas. However, with the current cell design, the chosen flow rates of 5 and 50 ml $min^{-1}$ (for liquids and gases) were used to avoid any potential leakage.

The flow rate of all liquid feeds was controlled with the use of peristaltic pumps (Masterflex L/S 600 RPM, Cole-Parmer Inc.). All liquid streams were supplied to the cell at a flow rate of 5 ml $min^{-1}$. A 0.1 M $H_2SO_4$ (99.99%, Fisher-Scientific Company) feed was provided to the anode compartment to facilitate the $O_2$ evolution reaction.

The gas stripper 60 include gas flow rates of 20 to 100 mL/min. In some embodiments, the flow rate was held constant at 50 mL/min.

All gases used were of 99.99% purity (Praxair Canada Ltd.) and were used as-received in mixed or pure form. The gas flow rates were held constant at 50 ml $min^{-1}$ during the experiments using panel-mounted flow meters (Gilmont Instruments, Cole-Parmer).

Example Embodiments

Embodiments disclosed herein include:

A. Methods of separating water, salt, $CO_2$, and crude oil from wastewater, the method comprising: providing gas/oil separation system that produces a waste saline water stream and a $CO_2$ stream; providing an electrochemical cell having an anode, a cathode, and three electrodialytic compartments; feeding a fresh water stream to the anode to produce H+ and $O_2$; feeding the waste $CO_2$ stream and $O_2$ to the cathode to produce bicarbonate ($HCO_3^-$) and hydroxide ($OH^-$); feeding the waste saline water stream to the center electrodialytic compartment; wherein the sodium ($Na^-$) from the waste saline water stream reacts with the bicarbonate to form $NaHCO_3$ and the chloride ($Cl^-$) from the waste saline water stream reacts with the $H^+$ to produce hydrochloric acid; and producing salt and desalinated water.

Embodiment A may have one or more of the following elements in any combinations:

Element 1, wherein the cathode comprises a Pt/C catalyst.

Element 2, wherein the anode comprises titanium.

Element 3, wherein oil refinery comprises a degassing tank, dehydrator, and a crude stabilizer.

Element 4, wherein oil refinery produces refined crude oil.

Element 5 wherein the method further comprises producing dry salt.

Element 6, wherein saline wastewater does not comprise hydrogen disulfide.

Element 7, wherein electrochemical cell comprises ion exchange membranes.

Embodiment B. Systems to separate water, salt, and $CO_2$ from wastewater, the system comprising: a wastewater feed comprising salt water and hydrocarbons, connected to a low pressure trap, wherein the low pressure trap separates the wastewater into three streams: a gas stream, a crude oil stream, and a salt water stream; and a water/$CO_2$ stream connected to an electrochemical cell; wherein: the gas steam is fed into a low pressure gas treatment system to produce a treated $CO_2$ stream; the salt water is fed into an oil/water separator to produce a saline water stream; and the water/$CO_2$ stream combines the treated $CO_2$ stream and the saline water steam, wherein the water/$CO_2$ stream is fed into the electrochemical cell to produce water free of saline and salt.

Embodiment B may have one or more of the following elements in any combinations:

Element 8 further comprising an oil refinery, wherein the crude oil stream is fed into the oil refinery.

Element 9, wherein the oil refinery comprises one or more of a degassing tank, a dehydrator, and a crude stabilizer.

Element 10, wherein the degassing tank connects to the wastewater feed and the salt water stream.

Element 11, wherein the dehydrator connects to the salt water stream.

Element 12, wherein the crude stabilizer connects to the gas stream.

By way of non-limiting example, exemplary combinations applicable to A and B include: Element 1 with Element 2; Element 2 with Element 3; Element 3 with Element 4; Element 2 with Element 5; Element 1 with Element 6; Element 7 with Element 8; Element 9 with Element 10; Element 10 with Element 11; and Element 11 with Element 12.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A method of separating water, salt, $CO_2$, and crude oil from wastewater, the method comprising:

producing a salt water stream and a gas stream from a gas/oil separation system;

feeding the gas stream into a low pressure gas treatment system to produce a treated $CO_2$ stream;

feeding the salt water stream into a water-oil separator to produce a waste saline water stream comprising sodium ($Na^+$) and chloride ($Cl^-$);

combining the waste saline water stream and the treated $CO_2$ stream to produce a water/$CO_2$ stream;

feeding the water/$CO_2$ stream to an electrochemical cell having an anode, a cathode, and three electrodialytic compartments;

feeding a fresh water stream to the anode to produce $H^+$ and $O_2$;

feeding the treated $CO_2$ stream and $O_2$ to the cathode to produce bicarbonate ($HCO_3$—) and hydroxide ions ($OH^-$);

feeding the waste saline water stream to a center electrodialytic compartment;

wherein the sodium ($Na^+$) from the waste saline water stream reacts with the bicarbonate to form $NaHCO_3$ and the chloride ($Cl^-$) from the waste saline water stream reacts with the $H^+$ to produce hydrochloric acid; and producing salt and desalinated water.

2. The method of claim 1, wherein the cathode comprises a Pt/C catalyst.

3. The method of claim 1, wherein the anode comprises titanium.

4. The method of claim 1, wherein the gas/oil separation system comprises a degassing tank, dehydrator, and a crude stabilizer.

5. The method of claim 4, wherein the gas/oil separation system produces refined crude oil.

6. The method of claim 1, wherein the method further comprises producing dry salt.

7. The method of claim 1, wherein the waste saline water stream does not comprise hydrogen disulfide.

8. The method of claim 1, wherein the electrochemical cell comprises ion exchange membranes.

9. A method of separating water, salt, $CO_2$, and crude oil from wastewater comprising:

separating a wastewater feed from an oil refinery into a gas stream comprising $CO_2$ and a salt water stream;

treating the gas stream to produce a treated $CO_2$ stream;

separating oil from the salt water stream to produce a saline water stream;

combining the saline water stream with the treated $CO_2$ stream to produce a water/$CO_2$ stream; and feeding the water/$CO_2$ stream to an electrochemical cell to produce salt and desalinated water.

10. The method of claim 9, further comprising:

separating the wastewater feed into a crude oil stream by a low pressure trap; and feeding the crude oil stream to an oil refinery comprising a degassing tank, a dehydrator, and a crude stabilizer.

11. The method of claim 10, wherein the low pressure trap produces a first salt water stream, the degassing tank produces a second salt water stream, and the dehydrator produces a third salt water stream.

12. The method of claim 11, wherein the first salt water stream, the second salt water stream, and the third salt water stream combine to form the salt water stream.

13. The method of claim 10, further comprising, by electrostatic coalescence, separating an emulsion of salt water and wet crude oil in the dehydrator to produce a dehydrator salt water stream and a dehydrator oil stream.

14. The method of claim 13, further comprising combining the dehydrator salt water stream with the salt water stream before entering an oil/water separator to produce the saline water stream.

\* \* \* \* \*